March 27, 1956 H. H. JONES ET AL 2,739,567
APPARATUS FOR DIP COATING ARTICLES
Filed March 8, 1954 2 Sheets-Sheet 2

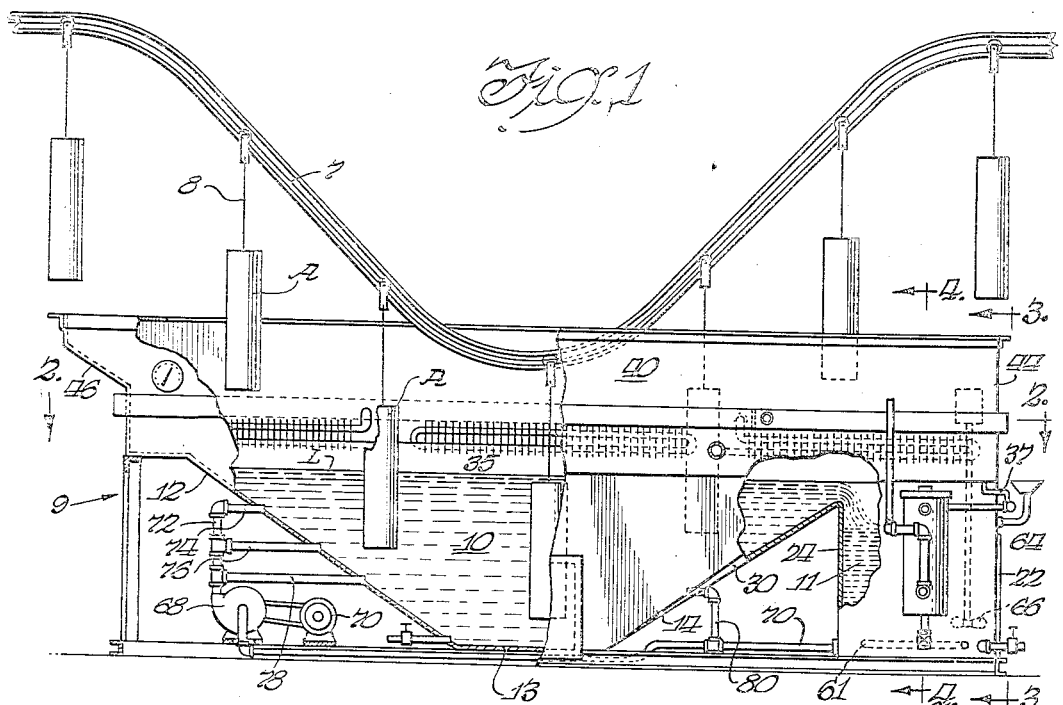

Inventors
Harry H. Jones
Raymond A. Hudock
by Bair, Freeman & Molinare
Attys.

United States Patent Office 2,739,567
Patented Mar. 27, 1956

2,739,567

APPARATUS FOR DIP COATING ARTICLES

Harry H. Jones, Huntington Woods, and Raymond A. Hudock, Royal Oak, Mich., assignors, by mesne assignments, to George W. Harding, Grosse Pointe Park, Mich.

Application March 8, 1954, Serial No. 414,588

5 Claims. (Cl. 118—429)

This invention relates to an apparatus for dip coating articles in which the liquid coating composition is maintained at an elevated temperature. More particularly, the invention consists in an improved apparatus for practicing the invention described in detail in U. S. Patent 2,515,489. In this method the coating composition is placed in a dip tank, the lower portion of which is heated to keep the coating composition hot. The space in the container just above the surface of the liquid composition is cooled to condense solvent vapors which are constantly being evaporated from the parts being dipped and the surface of the heated coating composition. This composition may be a paint, lacquer, or similar material containing a liquid film-forming substance, pigments and a volatile solvent, preferably a non-inflammable solvent the vapors of which are considerably heavier than air, such as trichlorethylene, perchlorethylene, carbon tetrachloride and other chlorinated hydrocarbons. Articles to be coated (which may or may not be preheated) are submerged in the hot composition and then withdrawn to the cooled solvent-free zone above the surface where the heat absorbed by the article before and/or during immersion immediately evaporates or flash volatilizes the solvent. The film remaining on the article sets up immediately and, consequently, the drips and areas of uneven thickness which usually result when applying a coating by dipping are completely eliminated.

The solvent is condensed in the upper cooled zone so that substantially no solvent escapes from the dip tank. This method makes possible complete elimination of fire hazard, recovery of substantially all solvent, and production of high quality work having uniform film thickness.

One object of the present invention is the provision of an apparatus in which the liquid coating composition is maintained at constant level at all times. The depth of the coating bath is always maintained just slightly greater than the height of the article being dipped, to keep the amount of coating composition in the tank to a minimum. The conveyor, of course, lowers each part to the same point in the tank. If, as the coating composition is used, the level is permitted to fall substantially, articles being coated will not be submerged completely. Maintenance of a constant level is even more important where it is desired to coat an article up to a predetermined mark. Furthermore, maintaining the coating bath at a constant level also insures a constant vapor level between the liquid level and the solvent-free zone.

Another object is to provide means associated with the dip tank for heating the coating composition, supplying reclaimed solvent and make-up solids to the coating composition, and for maintaining uniform viscosity and distribution of solids throughout the coating composition.

These and other objects will become apparent from the following description taken in conjunction with the accompanying drawings, in which:

Figure 1 is a side elevational view, partly in cross section, of a dip coating apparatus constructed in accordance with the invention.

Figure 2 is a view taken along the line 2—2 of Figure 1.

Figure 3 is a view taken along the line 3—3 of Figure 1.

Figure 4:
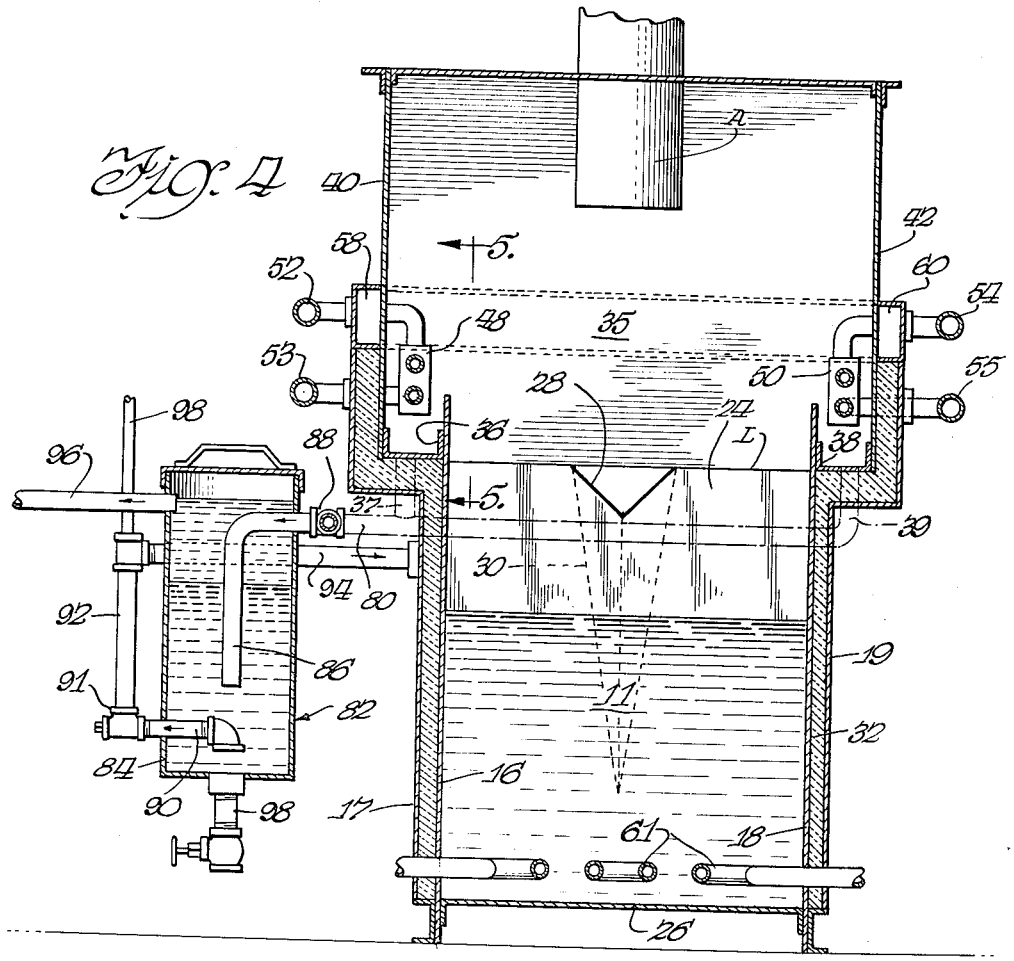
Figure 4 is an enlarged view taken along the line 4—4 of Figure 1.
Figure 5:
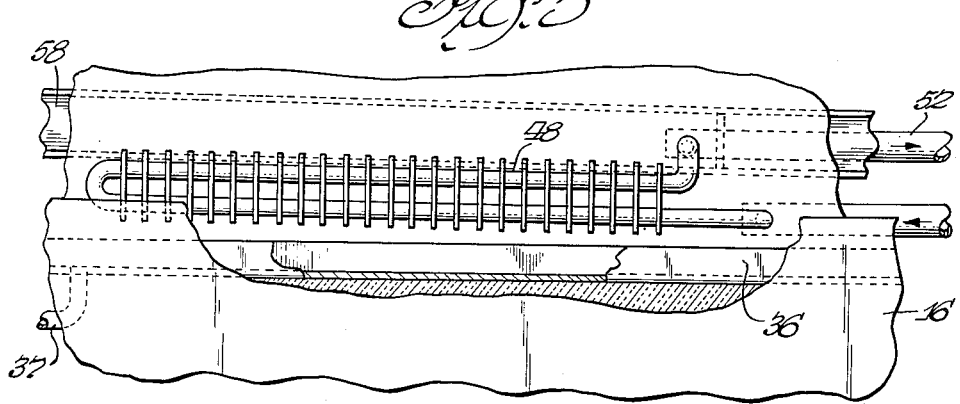
Figure 5 is a view taken along the line 5—5 of Figure 4.

The dipping apparatus of the invention is adapted for use with a conveyor 7 from which articles A to be coated are suspended by means of rods 8 as they are submerged in and withdrawn from the coating bath. The apparatus of the invention consists of a long open-top rectangular tank indicated generally at 9 having vertical side walls 16, 18, 20 and 22 resting on channel iron supports on the floor supporting the apparatus. The interior of tank 9 is divided laterally into two separate containers, a dip tank 10 formed from angular panels 12 and 14 which join with horizontal panel 13 to provide a generally V-shaped bottom for the dip tank, and a reservoir 11 formed by the vertical bulkhead, divider or panel 24, bottom panel 26 and end panel 22 of the large tank 9. Each of the laterally extending panels mentioned joins the side walls 16 and 18 of the tank 9 which serve as common longitudinal side walls for both containers 10 and 11. The dip tank 10 need not have a V-shaped bottom as indicated, but this shape is preferred since it conserves the amount of coating composition required for immersing the work by conforming to the path of the conveyor 7 on which the articles A are carried. When coating large articles, such as automobile frames, the cost of coating composition for filling the tank is no small item. The angular panel 14 of the dip tank joins the vertical panel 24 of the reservoir 11 along the top edge thereof. A V-shaped longitudinal trough 30 comprising a central depression in the panel 14 terminates in a weir or cut-out portion 28 in the panel 24 and serves as an outlet for coating composition constantly overflowing from dip tank 10 into reservoir 11. Any other suitable cutout or depressed portion which is lower than the general level of the side walls of the dip tank may be employed as a weir. Confining the flow to a relatively narrow, deep stream reduces solvent evaporation to a minimum. If desired, the height of the panel 24 may be reduced along its entire length to below the level L of the coating bath. A portion of the plate 24 surrounding the weir 28 may be made replaceable so that weirs of different sizes and shapes may be employed as required by different paint compositions or viscosities.

The lower sections of the vertical walls 16, 18 adjacent the liquid coating composition inside the containers 10 and 11 are insulated with glass wool 32 or other suitable insulating material sandwiched between said side walls and the outer panels 17, 19 to minimize the loss of heat from the coating composition.

Immediately above the liquid level L in the dip tank 10 troughs 36 and 38 (best shown in Figure 4) are provided outside the longitudinal vertical side walls 16 and 18 along the length of the tank 9. The troughs are not level but are slightly lower at one end so as to permit condensed moisture and solvent dropping into the trough to flow down to the drain pipes 37 and 39 near the lower ends of troughs 36 and 38, respectively. In large installations the troughs may be lowered in steps with an outlet at the lower end of each step. The walls 16 and 18 project a short distance above the inner walls of the troughs to form an extension or continuation thereof, so protect the condensate from paint splash and to hinder the flow of solvent vapors into the trough. Side panels 40 and 42 extend upwardly from the outer walls of the troughs 36 and 38 to increase the height of the side walls of the entire tank 9 for defining a cooling zone 35 above the level L. These side walls eliminate cross drafts that would carry the vapors out of the tank. The enclosure is completed at either end by end panels 44 and 46 which join the side panels 40 and 42. The top, of course, remains open, at least sufficiently to permit dipping articles into the coating bath.

In order to maintain the space just above the liquid, below the condensation temperature of the rising solvent vapors, finned coils 46 and 50 are mounted adjacent the side panels 40 and 42 directly above the troughs 36 and 38. The coils extend along the entire length of tank 9 and are supplied with cooling fluid through manifold pipes 50 and 54, as shown in Figures 2 and 4. If desired, the coils may extend around the entire periphery of the tank. After circulating through the coils the cooling fluid may be discharged through pipes 53 and 55 to drain, or it may be circulated through the jackets 58 and 60, as described below. Any suitable fluid may be used to circulate through the coils, ordinary tap water usually being satisfactory. Sufficient heat must be conducted away by means of the cooling fluid to maintain the space above the liquid level substantially free of solvent vapors. This requires that the temperature be substantially below the condensation point of the solvent vapors. Additional cooling for the zone 35 and the walls 40 and 42 is provided by freeboard coolers 58 and 60, which, in effect, are jackets that enclose a relatively narrow band along the side panels 40 and 42 just above the coils 48 and 50. The freeboard coolers are supplied with a cooling fluid through the pipes 52 and 54 which also supply the coils 48 and 50, or with fluid discharged from coils 48 and 50. The coolers maintain the walls 40 and 42 cool by conduction which also reduces "chimney effect." The "chimney effect" is the natural convection of the solvent vapors upwardly, and is accelerated by heated side walls.

The temperature of the coating composition will vary in accordance with the particular solvent contained therein. Preferably, the temperature is maintained just below the boiling point of the solvent. This temperature is sufficiently high to heat quickly the part being coated so that the solvent will flash off immediately upon emerging from the coating composition into the solvent-free zone 35. For a coating composition containing trichlorethylene as the solvent a temperature of 160–170° F. has been found to be satisfactory. To heat the composition and maintain it at this elevated temperature, suitable heating means such as steam coils 61, are provided in the bottom of the reservoir 11. Since all of the coating composition fed to the dip tank 10 passes through the reservoir 11 (as will appear hereinbelow) heating means within dip tank 10 have been eliminated. The quantity of steam permitted to flow through the coil 61 is regulated by means of a conventional thermostatic control submerged in the dip tank 10 which keeps the coating bath at constant temperature. Although a steam coil has been shown in the drawing, other heating means such as electric immersion units, or electric strip heaters or steam jackets in contact with the bottom 26 of the reservoir will serve equally well as a source of heat.

Where the quantity of heat transferred from the coating composition to the parts being coated is great, it is desirable to preheat the parts. Preheating permits using a smaller heating unit in reservoir 11, and reduces the period of time required for the part to reach thermal equilibrium. Preheating is desirable where the parts are of heavy cross section and relatively poor heat conductors. The temperature of the part should be about 5° higher than the temperature of the solvent vapors above the surface so that no condensation of solvent vapor occurs on the surface of the part.

Make-up solids may be added to the reservoir 11 through a filler 64 connecting to the end wall 22 near the top thereof, preferably below the level of the coating composition. A suitable agitator, such as the motor-driven stirrer 66, may be provided to circulate the composition within the reservoir to disperse thoroughly solids which may be added, and to maintain the solids in dispersed form. Circulation also insures maintenance of a uniform temperature and viscosity throughout the composition.

From the description thus far it is apparent that the coating composition is heated and mixed within the reservoir 11, and that by means of the overflow through the weir 28, the reservoir also cooperates to maintain the constant level L in the dip tank. To keep the overflow through the weir continuous it is necessary to circulate the composition from the reservoir back into the dip tank 10 and for this purpose a pump 68 is provided in the discharge line 70 which connects to the intake side of the pump. The pump is mounted on the bottom of the tank 9 beneath the angular panel 12 or other suitable place and is driven by a motor 70. Conduit 72 leads from the discharge end of pump 68 to the dip tank 10 through three branch lines, 74, 76 and 78, which connect to the dip tank through the wall 12. An exit pipe 80 in the wall 14 opposite the pipes 74, 76 and 78 connects to the line 70. Pump 68 operates continuously to circulate coating composition fed to line 70 from the reservoir 11 and from the dip tank through the line 80, back into the dip tank at several separate levels through the branch lines 74, 76 and 78. The discharge lines may connect to the dip tank 10 at several points around its periphery to provide better circulation. Continuous circulation of the composition in this manner not only maintains the level within the dip tank constant but also keeps the composition thoroughly mixed and at a uniform viscosity and temperature.

Some of the solvent vapors flashed from the parts and rising from the surface of the coating composition in the dip tank 10 and in the reservoir 11 are condensed on the coils 48 and 50. This liquid solvent then falls from the coils into the troughs 36 and 38. Moisture in the air is also condensed on the coils with the solvent vapors and likewise drops into the troughs 36 and 38. It is desirable to recover the solvent from the mixture, and for this purpose a separator 82 has been provided. The mixture of solvent and water in the troughs 36, 38 flows to the lower end of the troughs, out through the discharge conduits 37, 39, through the pipe 80, to a separator 82 in which the solvent is separated from the water by gravity. The separator is of conventional construction and consists of a cylindrical chamber 84 having an inlet pipe 86 near the top thereof for conducting the mixture of solvent and water into the cylinder. The line 80 connects to the inlet pipe 86 through the T 88. Because the solvent is considerably heavier than water it settles to the bottom and the water rises to the top. The water is removed from the cylinder 84 through the overflow 96 to the drain. The water-free solvent flows by gravity out of the cylinder through lines 90, 92 and 94 into the reservoir 11. The level of the solvent layer in the separator 82 is higher than the liquid level in the reservoir, thus causing gravity flow to the reservoir. Alternatively, the solvent may be recovered at the end of the T 91. By permitting the solvent recovered from the troughs to flow back into the reservoir as it is separated the composition in the reservoir is never diluted excessively, but the amount added is supplied continuously and in small quantities.

Although the dip tank and the reservoir preferably are housed within the same structure, as illustrated, these containers may be separate units connected only by the conduits required for circulating the coating composition from the reservoir to the dip tank. In such case each container is provided with separate cooling means for maintaining the zone just above the surface of the composition free of solvent vapors, or the reservoir only may be enclosed to prevent the escape of the solvent vapors. It is also pointed out that the overflow from the dip tank to the reservoir need not be over a weir or a depressed segment in a side wall. For example, an overflow pipe at the desired level, leading from the dip tank to the reservoir, will function satisfactorily.

From the foregoing description it is apparent that this invention provides a greatly improved apparatus for hot dip-coating of articles. The liquid level within the dip tank is always constant, thus insuring an adequate depth of coating composition and a vapor level of constant depth. The temperature of the coating composition is uniform and the solids remain homogeneously dispersed due to continuous circulation from the reservoir through the dip tank. Since all of the mixing of the coating composition, including the addition of solvents and coating solids, is performed within the reservoir, the dip tank is never disturbed and the dipping operation may be carried on continuously without in any way affecting the quality of the composition or of the coating deposited on the dipped articles.

The reservoir serves as a blending pot for diluting, melting down or concentrating the coating composition. The added solids usually contain only a very small proportion of solvent and require heat and agitation to disperse them effectively in a minimum time. Mixing can not be carried out conveniently in the dip tank simultaneously with the coating operation.

Various modifications in the construction of our apparatus and the arrangement of parts will occur to those skilled in the art without departing from the spirit of the invention. It is, therefore, our intention not to limit the invention to the forms described in the specification other than as necessitated by the scope of the appended claims.

What we claim is:

1. In an apparatus of the class described, an open elongated tank divided into a first and a second container by a laterally-extending panel, said panel having a cut-out portion in the top edge thereof through which liquid coating composition in said first container continuously overflows into said second container, heating means for maintaining the coating composition in said second container at elevated temperature, cooling coils mounted adjacent the side walls of said elongated tank above the liquid level in said first container to provide a cooling zone for condensing solvent evaporated from the surface of the coating composition in both containers, a trough mounted beneath said cooling coils to catch moisture and solvent condensed thereon, a gravity separator for separating the solvent from water, said separator being mounted so that the level of the solvent therein is above the liquid level in said second container, means for conducting said moisture and solvent from said trough to said separator, a conduit for permitting the solvent to flow by gravity into said second containers, and means for continuously conveying coating composition from below the liquid level of said first and second containers and discharging said composition under pressure back into the first container below the liquid level, thereby maintaining the coating composition in the first container at constant level, elevated temperature and uniformly mixed.

2. In an apparatus of the class described, an open elongated tank divided into a first and a second container by a laterally-extending panel, said panel having a cut-out portion in the top edge thereof through which liquid coating composition in said first container overflows continuously into said second container, heating coils in the bottom of said second container for maintaining the coating composition in both containers at elevated temperature, cooling means adjacent the side walls of said elongated tank above the liquid level in said first container to provide a cooling zone for condensing solvent evaporated from the surface of the coating composition in both containers, means for conveying condensed solvent back to said second container, and means for continuously conveying coating composition from said first and second containers, and discharging said composition under pressure back into the first container below the liquid level, thereby maintaining the coating composition in the first container at constant level, elevated temperature and uniformly mixed.

3. In an apparatus of the class described, an open elongated tank divided into a first and a second container by a laterally-extending panel, said panel having a cut-out portion in the top edge thereof through which liquid coating composition in said first container overflows continuously into said second container, heating means in said second container for maintaining the coating composition in both containers at elevated temperature, agitating means within said second container for stirring the coating composition, cooling means adjacent the side walls of said elongated tank above the liquid level in said first container to provide a cooling zone for condensing solvent evaporated from the surface of the coating composition in both containers, means for conveying condensed solvent back to said second container and means for continuously conveying coating composition from said first and second containers and discharging said composition under pressure back into the first container below the liquid level, thereby maintaining the coating composition in the first container at constant level, elevated temperature and uniformly mixed.

4. In an apparatus of the class described, an open elonated tank divided into a first and a second container by a laterally extending panel, said panel having a cut-out portion in the top edge thereof through which liquid coating composition in said first container overflows continuously into said second container, heating means in the bottom of said second container for maintaining the coating composition at elevated temperature, cooling means adjacent the side walls of said tank above the liquid level in said first container for condensing solvent evaporated from the surface of said coating composition, and means for continuously conveying coating composition from said second container and discharging said coating composition under pressure into said first container below the liquid level, thereby maintaining the coating composition in said first container at constant level, elevated temperature and uniformly mixed.

5. In an apparatus of the class described, an open elongated tank divided into a first and a second container by a laterally extending panel, said panel having a V-shaped cut-out portion in the top edge thereof through which liquid coating composition in said first container overflows continuously into said second container, heating means in the bottom of said second container for maintaining the coating composition in both containers at elevated temperature, cooling means adjacent the side walls of said tank above the liquid level in said first container for condensing solvent evaporated from the surface of said coating composition and means for continuously conveying coating composition from said second container and discharging said coating composition under pressure into said first container below the liquid level, thereby maintaining the coating composition in said first container at constant level, elevated temperature and uniformly mixed.

References Cited in the file of this patent

UNITED STATES PATENTS

| | | |
|---|---|---|
| 1,030,636 | Beadle | June 25, 1912 |
| 1,399,160 | Sevigne | Dec. 6, 1921 |
| 1,429,288 | Lander | Sept. 19, 1922 |
| 2,009,232 | Hood | July 23, 1935 |
| 2,515,489 | Borushko | July 18, 1950 |